United States Patent [19]

Duault

[11] Patent Number: 5,703,878

[45] Date of Patent: *Dec. 30, 1997

[54] METHOD OF TRANSFERRING STRUCTURED DATA OF CONSTANT BIT RATE TRAFFIC IN AN ATM NETWORK

[75] Inventor: Maurice Duault, Saint Laurent du Var, France

[73] Assignee: International Business Machines Corporation, Armonk, N.Y.

[*] Notice: The term of this patent shall not extend beyond the expiration date of Pat. No. 5,550,819.

[21] Appl. No.: 685,731

[22] Filed: Jul. 24, 1996

Related U.S. Application Data

[62] Division of Ser. No. 318,012, Oct. 4, 1994, Pat. No. 5,550,819.

[30] Foreign Application Priority Data

Oct. 14, 1993 [EP] European Pat. Off. ............ 93480159

[51] Int. Cl.$^6$ .................................................. H04L 12/56
[52] U.S. Cl. ........................... 370/395; 370/469; 370/471
[58] Field of Search .......................... 370/230, 232, 370/252, 253, 395, 397, 468, 469, 470, 471, 472, 474, 476

[56] References Cited

U.S. PATENT DOCUMENTS

| | | | |
|---|---|---|---|
| 5,280,476 | 1/1994 | Kojima et al. | 370/397 |
| 5,414,702 | 5/1995 | Kudoh | 370/395 |
| 5,414,707 | 5/1995 | Johnston et al. | 370/395 |
| 5,446,726 | 8/1995 | Rostoker et al. | 370/232 |
| 5,467,342 | 11/1995 | Logston et al. | 370/253 |

*Primary Examiner*—Alpus H. Hsu

[57] ABSTRACT

A method and an apparatus for transferring structured data of a constant bit rate traffic in an ATM network. The method uses the recurrence of alignment of the structured data field of length N in a 47 octet SA_PDU payload. At the transmitting end the CSI bit of the header of the first SAR_PDU is set to 1. It is then set to 0 for the next SAR_PDUs until the Nth SAR_PDU is reached. It is then again set to 1. This process is repeated until the last SAR_PDU has been transmitted.

6 Claims, 5 Drawing Sheets

METHOD OF TRANSFERRING STRUCTURED DATA OF CONSTANT BIT RATE TRAFFIC IN AN ATM NETWORK

This is a divisional of application Ser. No. 08/318,012 filed on Oct. 4, 1994, now U.S. Pat. No. 5,550,819.

FIELD OF THE INVENTION

This invention relates to telecommunications networks and more particularly to a method of transferring structured data of constant bit rate traffic in an ATM network.

BACKGROUND OF THE INVENTION

In a digital transmission network, data from a large number of users are serially transmitted from one network node to another network node, up to their respective final destinations.

Due to the evolution of networks towards more and more complex mixing of sub-networks with heterogeneous architectures, it is clear that there is a requirement to support distributed computing applications across high speed backbones that may be carrying LAN traffic, voice, video and traffic among channel-attached hosts and workstations.

Fast packet switching is now commonly used to accommodate the bursty, multiprocess communication found in distributed computing environments.

Recently, the concept of cell switching has been introduced. Cell switching can be thought of as a high performance form of packet switching. In packet switching networks, the packet size is a fixed maximum, but individual packets may always be shorter than the maximum. In a cell based network, cells have a fixed length. Cells are usually a lot shorter than packets because the use of short fixed length cells simplifies the hardware needed in each node of the network.

Asynchronous Transfer Mode (ATM) is a protocol for user access to and the internal operation of a public high speed cell switching system. This protocol is suitable for all kinds of traffic: data, voice, image, video.

In order to make an ATM network practical, it is necessary to adapt the internal network characteristics to those of the various traffic types that will use the network. This is the purpose of the ATM Adaptation Layer (AAL). The function of the AAL is thus to provide generalized interworking across the ATM network. The AAL function operates an end-to-end protocol across the ATM network to provide support for end users of different classes of service corresponding to generic classes of network traffic.

One of these classes (Class One) is intended for constant rate voice and video applications. It requires a constant bit rate at source and destination, a timing relationship between source and destination and permits to transfer structured information between source and destination.

Methods that satisfy these requirements are disclosed in Revised Recommendation I.363 from CCITT, which is included herein by reference.

This Recommendation describes the interactions between the AAL and the next higher (OSI) layer and the AAL and the ATM layer (sub-layer of layer 1). The AAL isolates the higher layers from the specific characteristics of the ATM layer by mapping the higher layers Protocol Data Units (PDU) into the information field of the ATM cell and vice versa. The AAL entities exchange information with the peer AAL entities to support the AAL functions.

To support services above the AAL, some independent functions must be performed in the AAL. These functions are organized in two logical sublayers, the Convergence Sublayer (CS) and the Segmentation and Reassembly sublayer (SAR).

The SAR prime functions are segmentation of higher layer information into a size suitable for the information field of an ATM cell and reassembly of the contents of ATM cell information fields into higher layer information.

The CS prime function is to provide the AAL service at the AAL Service Access Points (SAP).

The SAR sublayer at the transmitting end accepts a 47 octet block of data (SAR_PDU payload) from the CS sublayer and then adds a one octet SAR_PDU header to each block to form the SAR_PDU.

The SAR sublayer at the receiving end receives the 48 octet block of data from the ATM layer and separates the SAR_PDU header. The 47 octet block of the SAR_PDU payload is then passed to the CS sublayer. The basic AAL1 header is 1 octet long and the payload is 47 octets long.

FIG. 1 represents the SAR_PDU format of AAL type 1, wherein
SN: Sequence Number (4 bits)
SNP: Sequence Number Protection (4 bits)
CSI: Convergence Sublayer Indicator
SNC: Cell Sequence Number (0 to 7)
CRC: Cyclic Redundancy Check: corrects single errors
P: Parity: detects double errors The format of the Structured Data Transfer (SDT) method of Recommendation I.363 is shown in FIGS. 2 and 3. These Figures represent the format of the SAR_PDU payload. The SAR_PDU payload used by the CS has two formats, called non-P (FIG. 2) and P (FIG. 3) format. The CS procedure for SDT uses a pointer to delineate the structure boundaries. The pointer field contains the binary value of the offset, measured in octets, between the end of the pointer field and the first start of the structured block in the 93 octets payload consisting of the remaining 46 octets of this SAR_PDU payload and the 47 octets of the next SAR_PDU payload.

This method has many disadvantages. The SAR_PDU header length and the SAR_PDU payload length are variable. When one cell is lost, the receiver needs to know if the cell contained 46 or 47 octets of user information. The processing is complex. It requires reading of the pointer of P-formats and identification of the start of the structured data field.

An alternative is described wherein the cells are partially filled. The payload is partially filled with user data. The user data length is of N octets or a multiple of N octets. It guarantees that the first octet of the payload is also the first octet of the structured data field. The format of the partially filled cell SAR_PDU payload is shown in FIG. 4.

The disadvantages of the method are that it does not apply for structured data field lengths greater than 47 octets and that the dummy data transported in each cell reduces the efficiency of the ATM connection.

OBJECTS OF THE INVENTION

It is therefore a principal object of the invention to provide a method to transfer structured data of constant bit rate traffic in an ATM network, wherein, when a cell is lost during transmission, the receiver does not need to know the number of octets of user information contained in the lost cell.

It is another object of the invention to provide a method to transfer structured data of constant bit rate traffic in an ATM network which does not require reading of the pointer of P-formats and identification of the start of the structured data field.

BRIEF SUMMARY OF THE INVENTION

According to the invention, these objects are accomplished by providing a method and an apparatus for transferring structured data of constant bit rate traffic in a network using the Asynchronous Transfer Mode (ATM) protocol, wherein the ATM Adaptation Layer (AAL) maps the higher layers Protocol Data Units (PDU) into the information field of the ATM cell using the functions of the Segmentation And Reassembly (SAR) sublayer, said method comprising the following steps:

at the transmitting end,
  a) setting the Convergence Sublayer Indicator (CSI) equal to 1, in the first SAR_PDU of the connection, and
  b) setting an internal counter to N where N is the length of a structured data field
  c) setting CSI=0 in the next SAR_PDU, and
  d) decrementing the internal counter by one,
  e) repeating steps c) and d) until the contents of the counter is equal to 1,
  f) setting CSI=1 in the Nth SAR_PDU and resetting the counter to N,
  g) repeating steps c) to f) until the last SAR_PDU of the connection is transmitted,
at the receiving end,
  h) checking that CSI=1 in the first SAR_PDU received,
  i) setting the counter to N,
  j) checking that for the next SAR_PDU having CSI=1 the counter is at 1,
  k) resetting the counter to N,
  l) repeating steps j) and k) until the last SAR_PDU of the connection is received.

BRIEF DESCRIPTION OF THE DRAWINGS

The invention will be described with respect to a preferred embodiment thereof, which is further shown in the drawings in which.

DETAILED DESCRIPTION OF PREFERRED EMBODIMENT OF THE INVENTION

A packet-switching network usually consists of switching nodes and communication links or trunks between these nodes. Each of those nodes is linked to at least one other node through one or more communication links. The switching nodes are data processing systems including transmit/receive adapters connected to the communication links.

At each node, incoming data packets are selectively routed to one or more of the outgoing communication links terminated at another node. Such routing decisions are made in response to information in the header of the data packet.

In a cell switching network, cells are pieces of data, of fixed length, which are prefixed with headers containing control and routing information that identifies the originating and destination users. Each node examines each header and decides where to send the cell to move it closer to its destination.

As described above, Asynchronous Transfer Mode (ATM) is a protocol for user access to a high speed cell switching network and the ATM Adaptation Layer (AAL) performs functions required by the user, control and management planes and supports the mapping between the ATM layer and the next higher layer.

Figure 1:
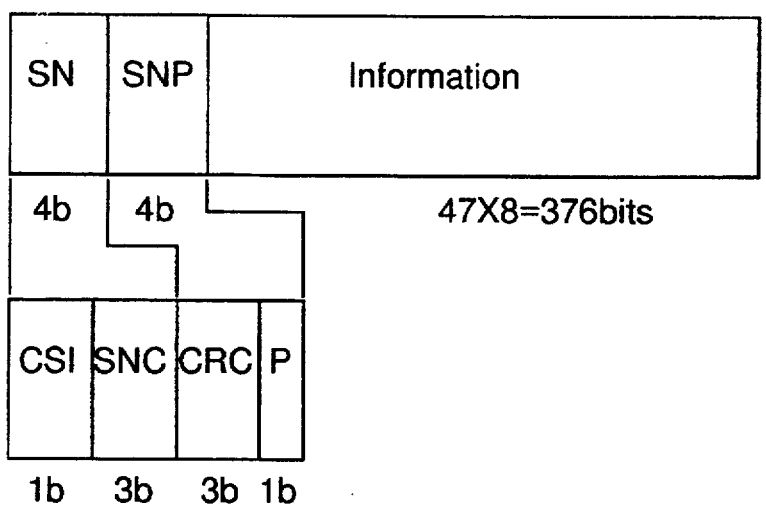
FIG. 1 shows the SAR_PDU format of AAL1.
Figure 2:
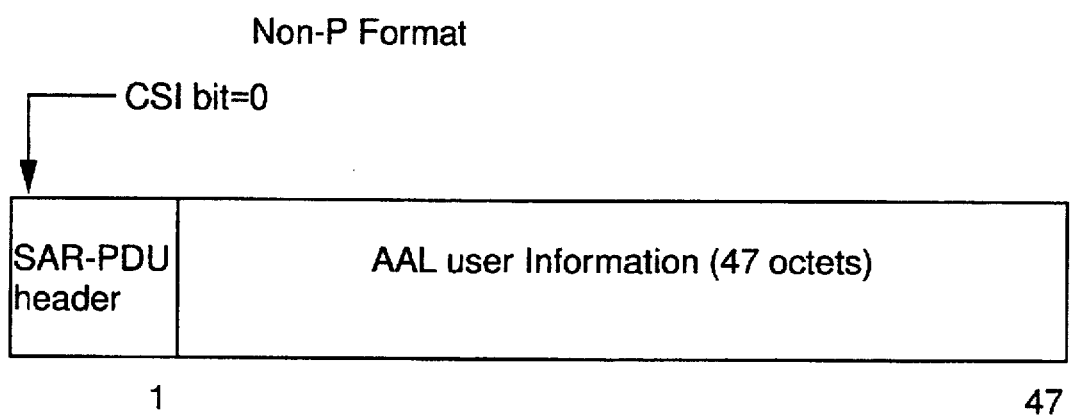
FIG. 2 shows the SAR_PDU Non-P Format for the Structured Data Transfer (SDT) method.
Figure 3:
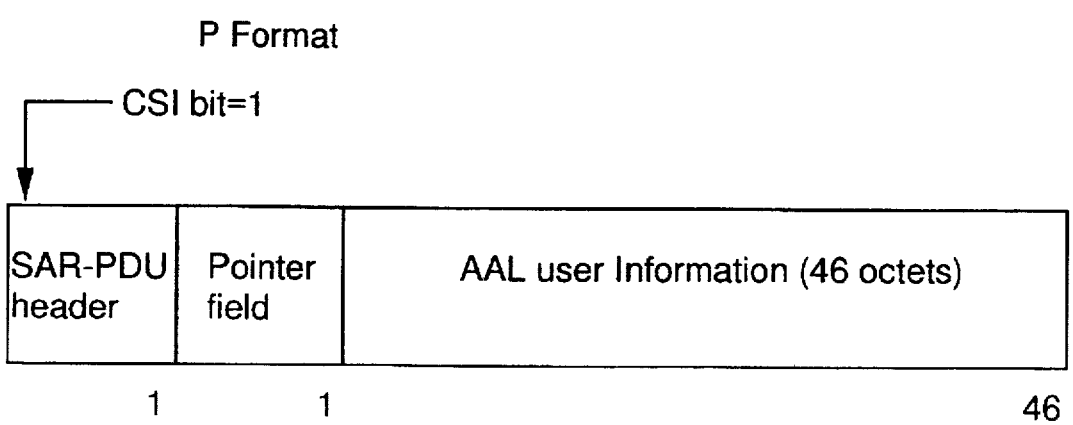
FIG. 3 shows the SAR_PDU P-Format for the Structured Data Transfer method.
Figure 4:
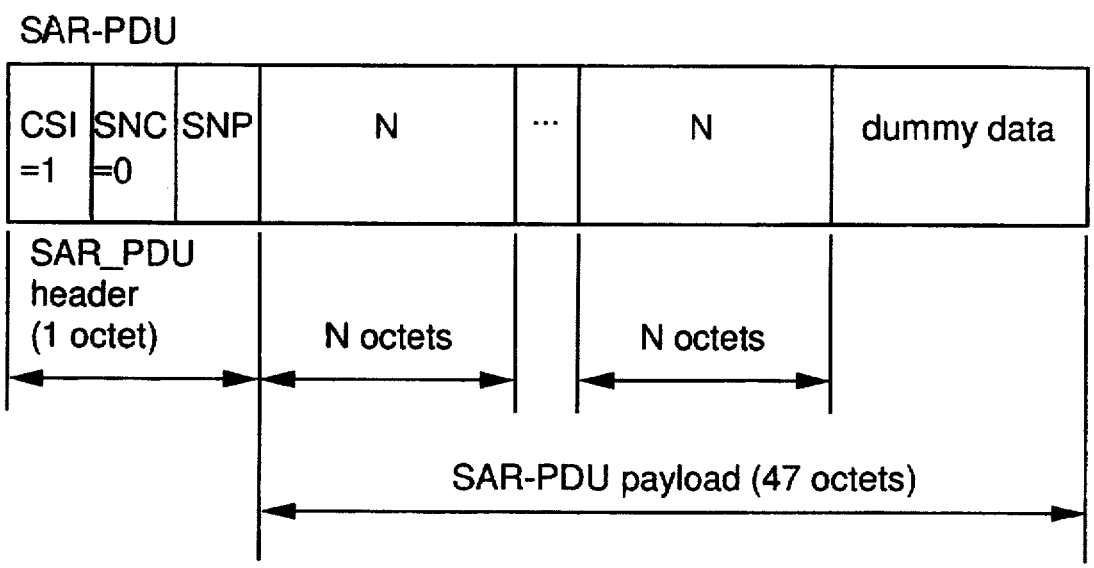
FIG. 4 shows the SAR_PDU format for partially filled cells.
Figure 5:
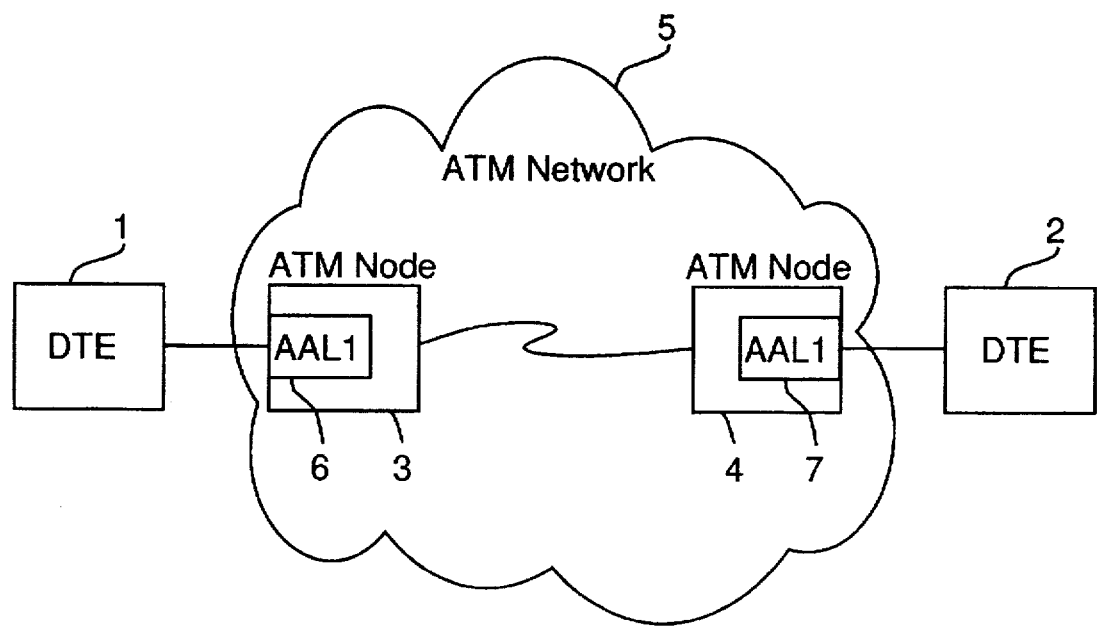
FIG. 5 is a block diagram representing a communications network within which the invention may be practiced.

FIG. 5 shows a communications network within which the invention can be practiced. Data Terminal Equipments (DTE) 1 and 2 are linked to ATM nodes 3 and 4, respectively. ATM nodes 3 and 4 are part of ATM network 5 and comprise AAL1 5 and AAL1 6, respectively.

The invention will now be described with reference to FIGS. 6A, 6B and 6C. As seen before, the AAL function operates an end-to-end protocol across the ATM network to provide support for the end users of different service classes. The services provided by AAL1 to the AAL user are, among others, transfer of service data units with a constant bit rate and delivery of them with the same bit rate and transfer of structured information between source and destination. By structured data it is meant data transfer with a constant bit rate and a fixed length recurrence (e.g. ISDN primary rate interface contains a 32 octet frame repeated every 125 microseconds).

Let us analyze what is the recurrence of alignment of a structured data field of length N in a 47 octets SAR-PDU payload. With N=length of the structured data field.

R(i)=Remainder of the last structured data field in the SAR_PDU payload with a Sequence Number i-1.

$R(1)=47-N*Ent(47/N)$ $$R(i+1)=47-(N-R(i))-N*Ent((47(N-R(i))/N)$$

When one analyzes the different remainders R(i), when N varies from 2 to 50, and i varies from 1 to N, it appears that R(N)=0. This means that the alignment of the structured data field in the cell with a Sequence Number N is the same as the one in the cell with a Sequence Number 1. This also shows that whatever is the value of N, there are always 47 structured data fields transported in N cells.

Figure 6A:
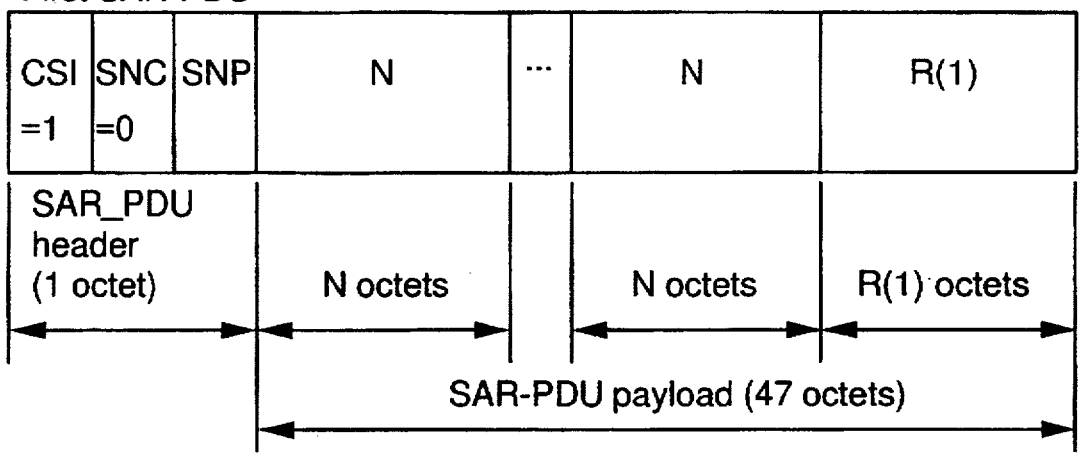
FIGS. 6A, 6B, and 6C show the alignment of structured data fields in the first, the second and the Nth SAR_PDU payloads, respectively.
Figure 6B:
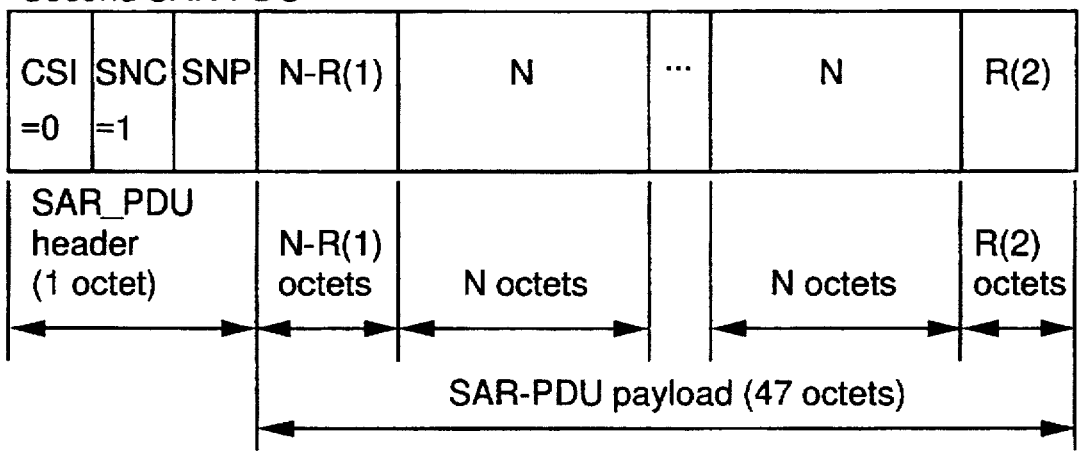
Figure 6C:
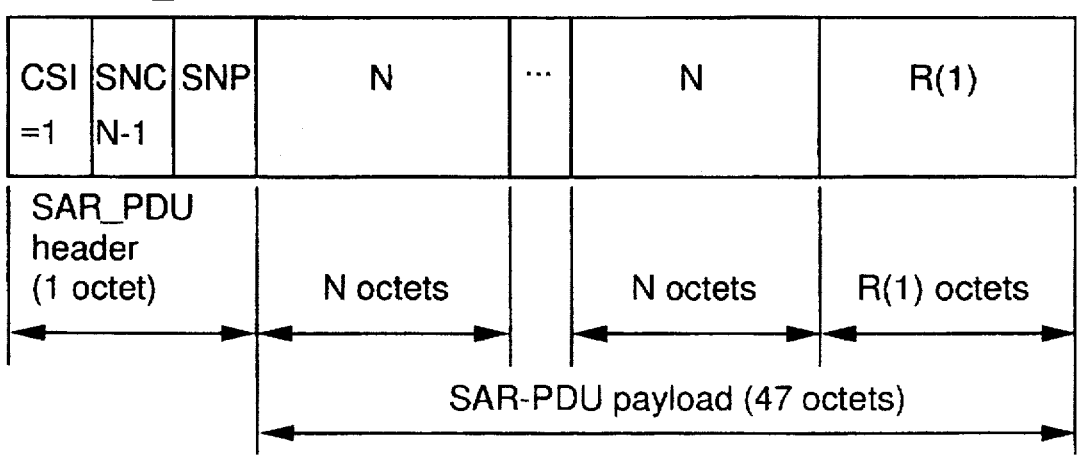

FIGS. 6(A), 6(B) and 6(C) show the alignment of Structured Data Fields in the first, the second and the Nth SAR_PDU payloads, respectively.

Figure 7:
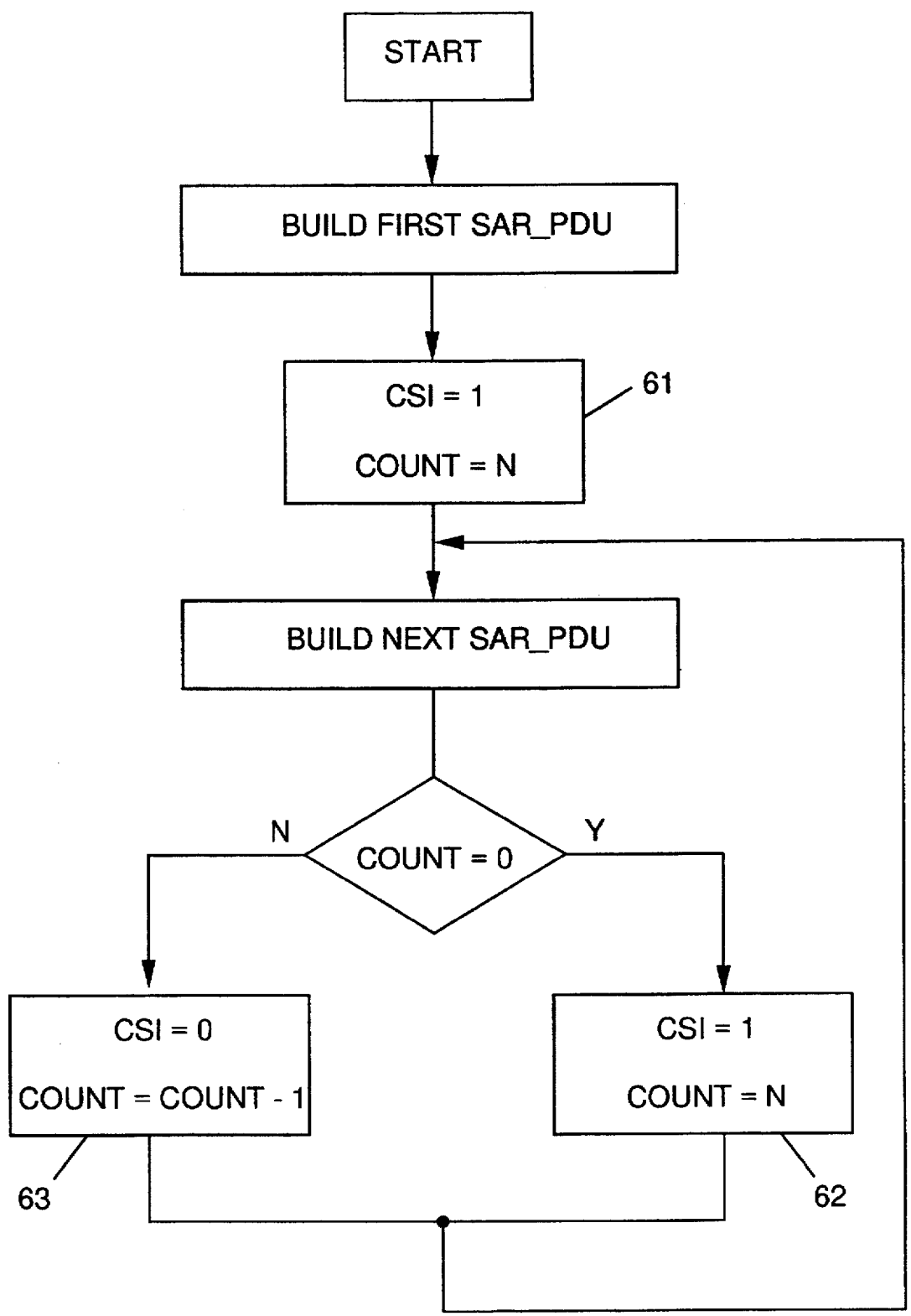
FIG. 7 is a flow diagram showing the operations at the transmitting end.

FIG. 7 is a flow diagram showing the operations at the transmitting end. The transmitter sets CSI=1 in the first SAR_PDU of the connection and sets the internal counter to N (61). It then sets CSI=1 and resets the counter to N in every Nth SAR_PDU (62) and sets CSI=0 and decrements the counter by 1 in every other SAR_PDU (63). This guarantees that when CSI=1, the first octet of the SAR_PDU payload is also the first octet of the structured data field.

Figure 8:
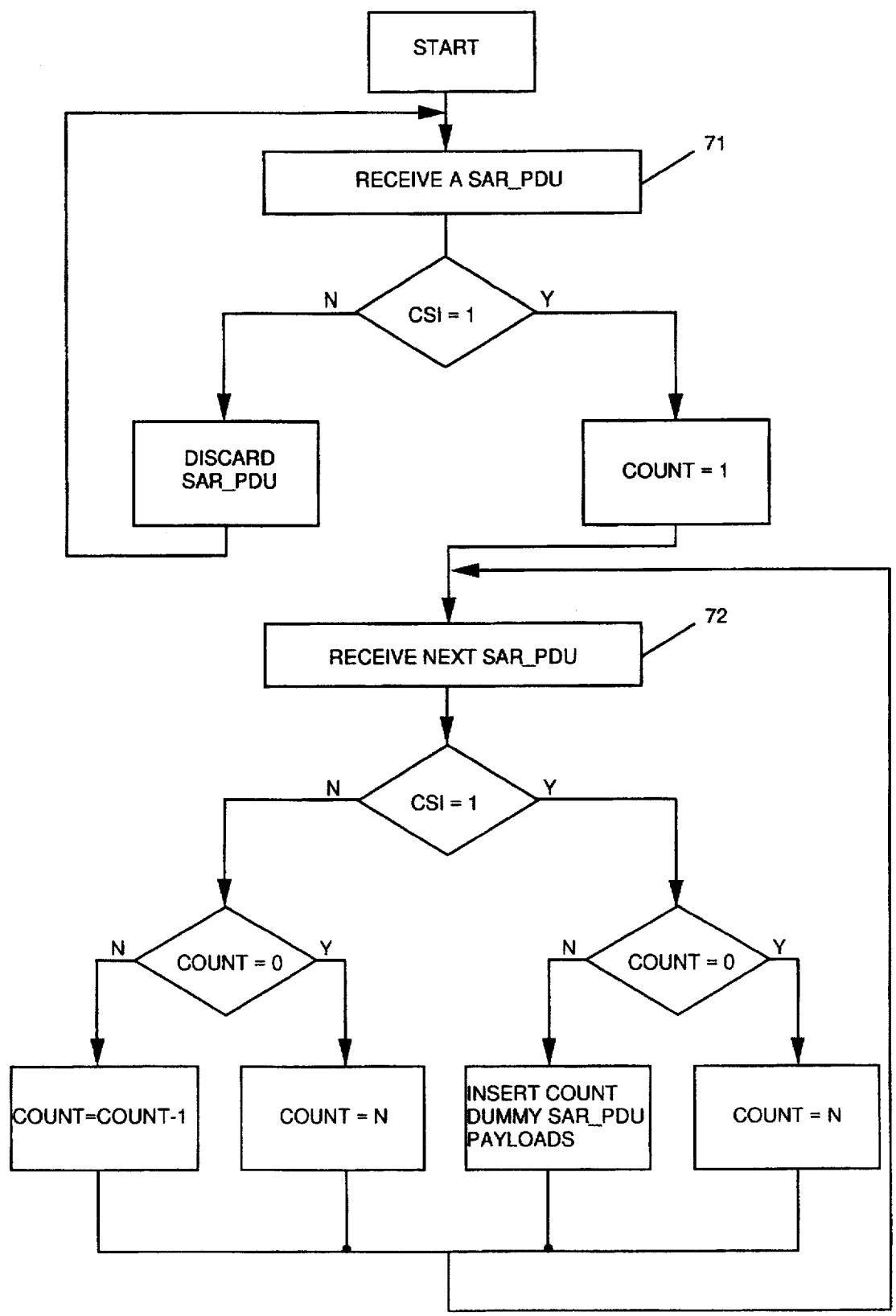
FIG. 8 is a flow diagram showing the operations at the receiving end.

FIG. 8 is a flow diagram showing the operations at the receiving end. The receiver checks that CSI=1 in the first SAR_PDU of the connection and sets the internal counter to N. If the first SAR_PDU has CSI=0, it discards the SAR_PDU and waits for the first SAR_PDU with CSI=1

(71). Then the receiver checks for the next SAR_PDUs that when CSI=1, it has received N or a multiple of N SAR_PDUs and resets the counter to N. If not, it inserts dummy SAR_PDU payloads in order to generate a multiple of N SAR_PDUs (72).

The advantage of the method is that the SAR_PDU header length and the SAR_PDU payload length are constant. When one cell is lost, the receiver knows that the cell con contained 47 octets of user information. The processing is simple. All the information needed is coded in 1 bit every N cells, where N is the length of the structured data field.

For the multiplexing of N channels of a T1 or E1 line inside an ATM connection, an alignment information is provided every 47 * 0.125 ms=5.875 ms, whatever is the value of N.

The method also permits to detect that a multiple of 8 cells are lost when the length of the structured data field is not a divider of 8, while current AAL1 does not detect that a multiple of 8 cells is lost.

It also allows accounting of the number of structured data fields transported. There are always 47 structured data fields transported in a number of cells equal to the length of the structured data field.

We claim:

1. A method of transferring, from a transmitter to a receiver, structured data of a constant bit rate traffic in a cell switching network using the Asynchronous Transfer Mode (ATM) protocol, wherein the ATM Adaptation Layer (AAL) maps the higher layers Protocol Data Units (PDU) into the information field of the ATM cell using the functions of the Segmentation And Reassembly (SAR) sublayer, characterized in that it comprises the following steps:

at the transmitting end, a) setting the Convergence Sublayer Indicator (CSI) equal to 1, in the first SAR_PDU of the connection, and b) setting an internal counter to N where N is the length of a structured data field, c) setting CSI=0 in the next SAR_PDU, and d) decrementing the internal counter by one, e) repeating steps c) and d) until the contents of the counter is equal to 1, f) setting CSI=1 in the Nth SAR_PDU and resetting the counter to N, g) repeating steps c) to f) until the last SAR_PDU of the connection is transmitted, at the receiving end, h) checking that CSI=1 in the first SAR_PDU received, i) setting an internal counter to N, j) decrementing the internal counter by one;

k) checking that for the next SAR_PDU having CSI=1, the counter is at 1, l) resetting the counter to N, m) repeating steps j), k), l) until the last SAR_PDU of the connection is received.

2. For use in a data communication network comprising a plurality of nodes interconnected by transmission links, a method for transmitting consecutive N-byte data structures from a source node to a destination node as a series of fixed length data cells, each cell having a header and a fixed length payload, said method comprising the steps of:

a) in a first data cell carrying an initial N-byte data structure, setting an alignment indicator to a first value to indicate that the N-byte data structure is aligned with the first byte of the payload of the cell;

b) setting the alignment indicator to the first value every N cells after the first data cell; and c) setting the alignment indicator to a second value for every other cell.

3. For use in a data communication network comprising a plurality of nodes interconnected by transmission links, a method for receiving from a source node consecutive N-byte data structures transmitted as a series of fixed length cells, each cell having a header and a fixed length payload, every Nth cell having an alignment indicator set to a first value indicating that an N-byte data structure is aligned with the payload of the cell, said method being performed at a destination node and comprising the steps of:

a) maintaining a count of the number of cells received since the last cell in which the alignment indicator had the first value;

b) when a newly received cell having the alignment indicator set to the first value is detected, determining whether the cell count is equal to N;

c) when the cell count is determined to be less than N, padding data received in the cell payloads by adding sufficient dummy payloads to the data at the destination node to produce an N-byte data structure.

4. A method as set forth in claim 3 including the additional step of recovering each N-byte data structure by concatenating received payloads and any dummy payloads generated at the destination node.

5. A method as set forth in any of claims 2–4 wherein the fixed length cells conform to Asynchronous Transfer Mode standards.

6. For use in a data communication network comprising a plurality of nodes interconnected by transmission links, an apparatus for causing consecutive N-byte data structures to be transmitted from a source node to a destination node as a series of fixed length cells, each cell having a header and a fixed length payload, said apparatus comprising:

a) means for segmenting each N-byte data structure into consecutive cells; and b) means for setting an alignment indicator in each of the cells, said means for setting being responsive to the first of the cells representing the first of the N-byte data structures and to every Nth cell thereafter to set the alignment indicator to a first value which indicates the N-byte data structure is aligned with the payload of the cell, said means for setting being responsive to all other cells to set the alignment indicator to a second value.

* * * * *